United States Patent
Soeda

(10) Patent No.: US 7,799,873 B2
(45) Date of Patent: *Sep. 21, 2010

(54) THERMOPLASTIC ELASTOMER COMPOSITION

(75) Inventor: Yoshihiro Soeda, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/914,182

(22) PCT Filed: May 2, 2006

(86) PCT No.: PCT/JP2006/309527

§ 371 (c)(1),
(2), (4) Date: Nov. 12, 2007

(87) PCT Pub. No.: WO2006/121141

PCT Pub. Date: Nov. 16, 2006

(65) Prior Publication Data

US 2009/0054599 A1      Feb. 26, 2009

(30) Foreign Application Priority Data

May 10, 2005    (JP)    ............ 2005-137309

(51) Int. Cl.
C08F 8/32    (2006.01)

(52) U.S. Cl. ............ 525/379; 525/185; 525/190; 525/331.9; 525/333.1; 525/333.2; 525/331.7; 525/333.7; 525/382; 525/386; 525/418; 525/420; 264/173.19

(58) Field of Classification Search ............ 525/331.9, 525/333.1, 333.2, 331.7, 333.7, 379, 382, 525/386, 418, 420
See application file for complete search history.

(56) References Cited

U.S. PATENT DOCUMENTS

| 5,244,961 | A | * | 9/1993 | Yu et al. ............ 524/514 |
| 5,451,642 | A | * | 9/1995 | Abe et al. ............ 525/179 |
| 6,013,727 | A | * | 1/2000 | Dharmarajan et al. ......... 525/72 |
| 6,020,431 | A | * | 2/2000 | Venkataswamy et al. ..... 525/166 |
| 6,035,899 | A | * | 3/2000 | Ohkoshi et al. ............ 138/123 |
| 2002/0147272 | A1 | * | 10/2002 | Lee et al. ............ 525/71 |
| 2006/0167203 | A1 | * | 7/2006 | Endo et al. ............ 528/44 |

FOREIGN PATENT DOCUMENTS

| CN | 1257528 A1 | 6/2000 |
| JP | 64-31864 A | 2/1989 |
| JP | 4-227957 A | 8/1992 |
| JP | 4-266966 A | 9/1992 |
| JP | 7-304970 A | 11/1995 |
| JP | 2000-514134 A | 10/2000 |
| JP | 2000-344975 | 12/2000 |
| JP | 3236247 | 9/2001 |
| JP | 2002-302604 A | 10/2002 |
| WO | WO-98-49234 A1 | 11/1998 |
| WO | 00/34383 | * 6/2000 |

OTHER PUBLICATIONS

Office Action in Chinese Patent Application No. 2006800149414, issued Feb. 5, 2010.

* cited by examiner

Primary Examiner—Vasu Jagannathan
Assistant Examiner—Robert C Boyle
(74) Attorney, Agent, or Firm—Connolly Bove Lodge & Hutz LLP

(57) ABSTRACT

A thermoplastic elastomer composition containing (i) a thermoplastic resin, (ii) an elastomer component discontinuously dispersed in the thermoplastic resin and (iii) a molecular chain extender, wherein the dispersed state of the particles of the elastomer component dispersed in the matrix of the thermoplastic elastomer composition is stabilized.

4 Claims, No Drawings

THERMOPLASTIC ELASTOMER COMPOSITION

RELATED APPLICATIONS

This application is a national stage application (under 35 U.S.C. §371) of PCT/JP2006/309527 filed May 2, 2006, which claims benefit of Japanese application 2005-137309 filed May 10, 2005, disclosure of which is incorporated herein by reference.

TECHNICAL FIELD

The present invention relates to a thermoplastic elastomer composition, more specifically relates to a thermoplastic elastomer composition in which a dispersed state of cross-linked particles is stabilized.

BACKGROUND ART

An elastomer composition obtained by irradiating electron beams to a thermoplastic elastomer composition including an electron beam cross-linking type thermoplastic resin, as a matrix, in which electron beam degradation type thermoplastic resin particles are discontinuously dispersed in it, as a dispersed phase, is known in the art (see Japanese Patent No. 3236247). A technology of irradiating electron beams to a syndiotactic polypropylene composition for the purpose of maintaining the flexibility and heat resistance is also known in the art (see Japanese Patent Publication (A) No. 2000-344975).

DISCLOSURE OF THE INVENTION

The object of the present invention resides in the stabilization of the dispersed state of cross-linked thermoplastic elastomer particles dispersed in a matrix of a thermoplastic elastomer composition, in which an elastomer component is discontinuously dispersed in a thermoplastic resin.

In accordance with the present invention, there is provided a thermoplastic elastomer composition comprising (i) a thermoplastic resin, (ii) an elastomer component discontinuously dispersed in the thermoplastic resin and (iii) a molecular chain extender.

According to the present invention, by compounding a molecular chain extender to a thermoplastic elastomer composition, in which an elastomer component is discontinuously dispersed in a thermoplastic resin to increase the molecular weight of the matrix, whereby it is possible to increase the melt viscosity, to shift a flow starting temperature to the high temperature side, and to prevent the formation (or generation) of roughened or scratched surface, etc. and to suppress agglomeration of dispersed elastomer particles in the shaping process and, when the thermoplastic elastomer composition is formed to a film, it is possible to achieve a more uniform dispersion of the dispersed particles in the film as a whole.

BEST MODE FOR CARRYING OUT THE INVENTION

The singular forms used in the Description and the attached Claims should be understood as including the plural case except when otherwise clear from the context.

The inventor increased the molecular weight of a thermoplastic resin by adding a molecular chain extender to a thermoplastic elastomer composition comprising a thermoplastic resin, as a matrix, in which an elastomer component was discontinuously dispersed, after an elastomer component was discontinuously dispersed in, for example, a matrix of the thermoplastic resin. As a result, the molecular weight of the matrix and the thermoplastic elastomer composition having superior durability was obtained, without changing the size of the dispersed elastomer.

The resin component of the thermoplastic elastomer according to the present invention includes, for example, polyamide-based resins (e.g., Nylon 6 (N6), Nylon 66 (N66), Nylon 11 (N11), Nylon 12 (N12), Nylon 610 (N610), Nylon 612 (N612), etc.), polyester-based resins (e.g., polybutylene terephthalate (PBT), polyethylene terephthalate (PET), polyethylene isophthalate (PEI), etc.), polynitrile-based resins (e.g., polyacrylonitrile (PAN), polymethacrylonitrile, etc.), polymethacrylate-based resins (e.g., polymethyl methacrylate (PMMA), polyethyl methacrylate, etc.), polyvinyl-based resins (e.g., vinyl acetate, polyvinyl alcohol (PVA), polyvinylidene chloride (PDVC), polyvinyl chloride (PVC), etc.), cellulose-based resins (e.g., cellulose acetate and cellulose acetobutyrate), fluorine-based resins (e.g., polyvinylidene fluoride (PVDF), polyvinyl fluoride (PVF), etc.), imide-based resins (e.g., aromatic polyimides (PI)), etc. may be used.

The thermoplastic elastomer composition according to the present invention is obtained by blending the thermoplastic resin and the elastomer. As such an elastomer, for example, diene-based rubbers and hydrogenates thereof (e.g., NR, IR, SBR, BR, NBR, etc.), olefin-based rubbers (e.g., ethylene propylene rubber (EPDM, EPM), IIR etc.), acryl rubbers (ACM), halogen-containing rubbers (e.g., Br-IIR, Cl-IIR, brominated isobutylene para-methylstyrene copolymer (Br-IPMS) etc.), silicone rubbers (e.g., methylvinyl silicone rubber, dimethyl silicone rubber, etc.), sulfur-containing rubbers (e.g., polysulfide rubber), fluorine rubbers (e.g., vinylidene fluoride-based rubbers and fluorine-containing vinyl ether-based rubber), thermoplastic elastomers (e.g., a styrene-based elastomer, olefin-based elastomers, ester-based elastomer, urethane-based elastomer and polyamide-based elastomer) etc. may be mentioned. These may be used as blends of two or more types.

The elastomer component may be dynamically vulcanized, when mixed with the thermoplastic resin. Here, the "dynamic vulcanization" means charging a thermoplastic resin, an elastomer component and a cross-linking agent into a twin-screw kneader, etc. and then vulcanizing the elastomer component, while melt kneading the resultant mixture. The vulcanizer, the vulcanization aid, the vulcanization conditions (temperature and time), etc. in the case of the dynamic vulcanization may be suitably determined depending upon composition of the elastomer component added and are not particularly limited. As the vulcanizer, a general rubber vulcanizer (or cross-linking agent) may be used. Specifically, as a sulfur-based vulcanizer, powdered sulfur, precipitated sulfur, etc. may be used in an extent of, for example, 0.5 to 4 phr (parts by weight based upon 100 parts by weight of rubber component (polymer)). Further, an organic peroxide may be used.

As an organic peroxide-based vulcanizer, specifically, for example, dicumyl peroxide, di-t-butyl peroxide, t-butyl cumyl peroxide, benzoyl peroxide, 2,5-dimethyl-2,5-di(t-butylperoxy)hexine-3, 2,5-dimethyl-2,5-di(t-butylperoxy)hexane, 2,5-dimethyl-2,5-mono(t-butylperoxy)hexane, 1,3-bis(t-butylperoxyisopropyl)benzene, 4,4-di-t-butylperoxyvaleric acid-n-butyl ester, etc. may be mentioned. As the thiourea-based vulcanization accelerator, ethylene thiourea, diethyl thiourea, etc. may be mentioned.

Further, in the elastomer component, general rubber use compounding agents may be used concurrently. For example, zinc white, stearic acid, oleic acid and their metal salts etc. may be used. The method of producing the thermoplastic elastomer composition comprises melt kneading, in advance, a thermoplastic resin component and an elastomer component (in the case of rubber, an unvulcanized rubber) by a twin-screw kneader, etc. to disperse an elastomer component, as a dispersed phase (i.e., domain), in a thermoplastic resin forming a continuous (matrix phase). When vulcanizing the elastomer component, it is also possible to add the vulcanizer, while kneading, so as to dynamically vulcanize the elastomer component. Further, the various types of compounding agents (except for the vulcanizer) added to the thermoplastic resin or elastomer component may also be added during the kneading, but are preferably mixed before the kneading. The kneader used for kneading the thermoplastic resin and elastomer component is not particularly limited, but a screw type extruder, a kneader, a Banbury mixer, a twin-screw kneader etc. may be used. As the conditions of the melt kneading, the temperature should be at least the temperature at which the thermoplastic resin melts. Further, the shear rate at the time of kneading is preferably 1000 to 7500 $sec^{-1}$. The time of the kneading as a whole is 30 seconds to 10 minutes. Further, in the case of adding a vulcanizer, the vulcanization time after addition is preferably 15 seconds to 5 minutes. The thermoplastic elastomer composition formed by the above method is next formed into a sheet-like film by extrusion or calendaring. The method of film formation may use the usual method of forming a thermoplastic resin or a thermoplastic elastomer into a film.

The film obtained in this way is structured, as a matrix of a thermoplastic resin (A), in which an elastomer component (B) is dispersed, as a dispersed phase (i.e., domain). By forming a such dispersed structure state, thermoplastic processing becomes possible and it becomes possible to give, for the film capable of serving as an air permeation preventive layer, a sufficient flexibility and to give a sufficient rigidity by the effect of the resin layer serving as the continuous phase. Regardless of the amount of the elastomer component, at the time of molding, a moldability comparable to that of a thermoplastic resin can be obtained, and, therefore, the film formation becomes possible by a usual resin molding machine, that is, an extrusion molding or a calendaring molding.

The composition ratio of the specific thermoplastic resin (A) and the elastomer component (B), when blending the thermoplastic resin and the elastomer is not particularly limited and may be suitably determined by the balance of the thickness of the film, the air permeation preventing property and the flexibility, but the preferable range is a weight ratio (A)/(B) of 10/90 to 90/10, more preferably 15/85 to 90/10.

The molecular chain extender usable for the thermoplastic elastomer composition of the present invention may, for example, be any molecular chain extender generally used for extending a molecular chain of a polymer in the past. Specifically, aliphatic amines, such as mexamethylene diamine, isocyanates, such as poly(n-hexylisocyanate), amino acid analogs, such as ε-aminocaproic acid, dicarboxylic acids such as adipic acid, etc. may be mentioned. The amount of the molecular chain extender used is not particularly limited, but the use of 1 to 5 parts by weight per 100 parts by weight of the thermoplastic resin is preferable and the use of 1 to 4 parts by weight is more preferable.

The thermoplastic elastomer and the thermoplastic resin forming the thermoplastic elastomer composition according to the present invention may also contain, in addition to the above components, carbon black, silica or other fillers, a vulcanization or cross-linking agent, vulcanization or cross-linking accelerator, various types of oils, antioxidant, plasticizer, compatibilizer and other various types of additives generally used in tire and other general rubbers and thermoplastic resins compounded therein. These additives may be mixed by a general method to form a composition and may be further used for vulcanization or cross-linking as necessary. The amounts of these additives added may be made the conventional general amounts compounded so long as the object of the present invention is not contravened.

EXAMPLES

Examples will now be used to further explain the present invention, but, of course, the scope of the present invention is not limited to these Examples.

Examples 1 to 6 and Comparative Examples 1 to 2

Preparation of Samples

The thermoplastic elastomer compositions having the formulations shown in Table I were kneaded by a twin-screw-type kneading extruder, then cooled in water, pelletized by a cutter, then melt extruded by a single-screw type extruder to form a film. This was used to evaluate the physical properties by the test method shown below. The results are shown in Table I.

Test Method for Evaluation of Rubber Physical Properties

Melt viscosity: Melt viscosity was determined when the melt polymer flows through a capillary according to JIS K7199.

Surface roughness: A laminate obtained by laminating a vulcanized rubber sheet on the film formed by the above method was heated to a temperature of a melting point of the matrix resin minus 5° C., the rubber sheet was peeled off and then the surface smoothness (or roughness) at that time was evaluated by the following criteria:

Good . . . smooth

Poor . . . roughened (or scratched)

TABLE I

|  | Comp. Ex. 1 | Comp. Ex. 2 | Ex. 1 | Ex. 2 | Ex. 3 | Ex. 4 | Ex. 5 | Ex. 6 |
|---|---|---|---|---|---|---|---|---|
| Formulation (parts by weight) | | | | | | | | |
| Exxpro 89-4[*1] | 100 | 100 | 100 | 100 | 100 | 100 | 100 | 100 |
| Zinc White[*2] | 0.15 | 0.15 | 0.15 | 0.15 | 0.15 | 0.15 | 0.15 | 0.15 |
| Stearic acid[*3] | 0.6 | 0.6 | 0.6 | 0.6 | 0.6 | 0.6 | 0.6 | 0.6 |

TABLE I-continued

|  | Comp. Ex. 1 | Comp. Ex. 2 | Ex. 1 | Ex. 2 | Ex. 3 | Ex. 4 | Ex. 5 | Ex. 6 |
| --- | --- | --- | --- | --- | --- | --- | --- | --- |
| Zinc stearate*[4] | 0.3 | 0.3 | 0.3 | 0.3 | 0.3 | 0.3 | 0.3 | 0.3 |
| Nylon 11*[5] | 100 | — | 200 | 200 | 53 | 53 | — | — |
| Nylon 6, 66*[6] | — | 100 | — | — | — | — | 100 | 100 |
| Molecular Chain extender*[7] | 0 | 0 | 1 | 5 | 1 | 5 | 1 | 5 |
| Melt viscosity (Pa · s) | 300 | 330 | 350 | 500 | 700 | 750 | 370 | 550 |
| Roughness | Poor | Poor | Good | Good | Good | Good | Good | Good |

Notes to Table I
*[1]Brominated isobutylene-p-methyl styrene copolymer made by Exxon Mobil Chemical.
*[2]Zinc oxide made by Seido Chemical Industry Ltd.
*[3]Stearic acid made by Chiba Fatty Acid Co. Ltd.
*[4]Zinc stearate made by Seido Chemical Industry Ltd.
*[5]Nylon 11 Rilsan B made by Arkema Company
*[6]Nylon 6, 66 Amylan CM6001 made by Toray Industry Ltd.
*[7]6-aminohexanoic acid made by Kanto Chemical Co., Ltd.

INDUSTRIAL APPLICABILITY

According to the present invention, by increasing the molecular weight of the matrix of a thermoplastic elastomer composition, it is possible to shift the flow starting temperature in the shaping step to the high temperature side and to prevent the formation (or generation) of roughened (or scratched) surface, etc. and to possible to prevent the deterioration of the dispersion of dispersed particles in the film or other shaped article, and, therefore, this is suitable for use as a surface layer of a laminate requiring a smooth surface, etc.

The invention claimed is:

1. A thermoplastic elastomer composition comprising (i) a thermoplastic polyamide-based resin, (ii) an elastomer component of a halogen-containing rubber discontinuously dispersed in the thermoplastic resin and (iii) a molecular chain extender, wherein the molecular chain extender (iii) is at least one member selected from the group consisting of hexamethylene diamine, and 6-aminohexanoic acid, wherein the elastomer component (ii) is dynamically vulcanized, when mixed with the thermoplastic resin (i), in the presence of a crosslinking agent, while melt kneading.

2. A thermoplastic elastomer composition as claimed in claim 1, wherein a composition ratio (A)/(B) by weight of the polyamide-based resin (A) and halogen-containing rubber (B) is 10/90 to 90/10 and the amount of the molecular chain extender is 1 to 5 parts by weight based upon 100 parts by weight of the thermoplastic resin.

3. A thermoplastic elastomer composition as claimed in claim 1, wherein said halogen-containing rubber is brominated isobutylene para-methylstyrene copolymer (Br-IPMS).

4. A thermoplastic elastomer composition as claimed in claim 2, wherein said halogen-containing rubber is brominated isobutylene para-methylstyrene copolymer (Br-IPMS).

* * * * *